US008719260B2

(12) United States Patent
Betz

(10) Patent No.: US 8,719,260 B2
(45) **Date of Patent: *May 6, 2014**

(54) IDENTIFYING THE UNIFYING SUBJECT OF A SET OF FACTS

(75) Inventor: Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,755

(22) Filed: Nov. 22, 2011

(65) Prior Publication Data

US 2012/0072433 A1 Mar. 22, 2012

Related U.S. Application Data

(63) Continuation of application No. 12/939,981, filed on Nov. 4, 2010, now Pat. No. 8,078,573, which is a continuation of application No. 11/142,765, filed on May 31, 2005, now Pat. No. 7,831,545.

(51) Int. Cl.
*G06F 7/00* (2006.01)
*G06F 17/30* (2006.01)

(52) U.S. Cl.
USPC .......... 707/723

(58) Field of Classification Search
USPC .......... 707/711, 723, 999.2
See application file for complete search history.

(56) References Cited

U.S. PATENT DOCUMENTS 5,010,478 A 4/1991 Deran .......... 364/200
5,133,075 A 7/1992 Risch .......... 395/800
5,475,819 A 12/1995 Miller et al. .......... 395/200.03
5,519,608 A 5/1996 Kupiec .......... 364/419.08
5,546,507 A 8/1996 Staub
5,560,005 A 9/1996 Hoover et al. .......... 395/600
5,574,898 A 11/1996 Leblang .......... 395/601
5,675,785 A 10/1997 Hall et al. .......... 395/613
5,694,590 A 12/1997 Thuraisingham et al. .......... 395/600
5,717,911 A 2/1998 Madrid et al. .......... 395/602
5,717,951 A 2/1998 Yabumoto .......... 395/831
5,724,571 A 3/1998 Woods .......... 395/605

(Continued)

FOREIGN PATENT DOCUMENTS

JP 11265400 A 9/1999 .......... G06F 13/00
JP 2002-157276 A 5/2002 .......... G06F 17/30

(Continued)

OTHER PUBLICATIONS

Google Inc., Office Action, Canadian Patent Application 2,610,208, Sep. 21, 2011, 3 pgs.

(Continued)

*Primary Examiner* — Aleksandr Kerzhner
(74) *Attorney, Agent, or Firm* — Morgan, Lewis & Bockius LLP

(57) ABSTRACT

A method and system for identifying a subject of a document and facts included within are described. A source document that includes facts and linking documents that include hyperlinks to the source document are identified. The anchor texts of the hyperlinks are identified and candidate labels are generated based on the anchor texts. One of the candidate labels is selected as the unifying subject of the facts. An information set, distinct from the source document, is stored in a facts database, wherein the stored information set includes the unifying subject, and source document information associating the source document with the information set.

9 Claims, 7 Drawing Sheets

Identify document with A-V pairs — 302
Identify linking documents that link to the document — 304
Identify anchor texts in links to the document — 306
Generate candidate labels from the anchor texts — 308
Select a first label according to first predefined criteria — 310
Associate first label with the document and/or the A-V pairs — 312
Select second labels of the candidate labels according to second predefined criteria — 314
Associate second labels with the document and/or the A-V pairs — 316

(56) References Cited

U.S. PATENT DOCUMENTS 5,778,373 A 7/1998 Levy et al. .................... 707/100
5,778,378 A 7/1998 Rubin .......................... 707/103
5,787,413 A 7/1998 Kauffman et al. ................ 707/2
5,793,966 A 8/1998 Amstein et al. .......... 395/200.33
5,802,299 A 9/1998 Logan et al. .................. 709/218
5,819,210 A 10/1998 Maxwell, III et al. ............ 704/9
5,822,743 A 10/1998 Gupta et al. .................... 706/50
5,826,258 A 10/1998 Gupta et al. ...................... 707/4
5,920,859 A 7/1999 Li .................................... 707/5
5,943,670 A 8/1999 Prager .............................. 707/5
5,956,718 A 9/1999 Prasad et al. .................... 707/10
5,987,460 A 11/1999 Niwa et al. ........................ 707/6
6,006,221 A 12/1999 Liddy et al. ....................... 707/5
6,038,560 A 3/2000 Wical ................................ 707/5
6,044,366 A 3/2000 Graffe et al. ....................... 707/2
6,052,693 A 4/2000 Smith et al. .................... 707/104
6,064,952 A 5/2000 Imanaka et al. .................. 704/9
6,073,130 A 6/2000 Jacobson et al. .................. 707/5
6,112,203 A 8/2000 Bharat et al. ...................... 707/5
6,122,647 A 9/2000 Horowitz et al. ............. 715/513
6,134,555 A 10/2000 Chadha et al. ................ 707/102
6,182,063 B1 1/2001 Woods .............................. 707/3
6,202,065 B1 3/2001 Wills ................................ 707/5
6,212,526 B1 4/2001 Chaudhuri et al. ........... 707/102
6,240,546 B1 5/2001 Lee et al. .......................... 717/4
6,263,328 B1 7/2001 Coden et al. ...................... 707/3
6,263,358 B1 7/2001 Lee et al.
6,266,805 B1 7/2001 Nwana et al.
6,285,999 B1 9/2001 Page ................................. 707/5
6,289,338 B1 9/2001 Stoffel et al. ..................... 707/3
6,311,194 B1 10/2001 Sheth et al. ................... 707/505
6,314,555 B1 11/2001 Ndumu et al.
6,327,574 B1 12/2001 Kramer et al. .................. 705/14
6,349,275 B1 2/2002 Schumacher et al. ............ 704/8
6,377,943 B1 4/2002 Jakobsson ......................... 707/2
6,438,543 B1 8/2002 Kazi et al.
6,470,330 B1 10/2002 Das et al. .......................... 707/2
6,473,898 B1 10/2002 Waugh et al. ................. 717/168
6,487,495 B1 11/2002 Gale et al. ..................... 701/209
6,502,102 B1 12/2002 Haswell et al. ............... 707/102
6,519,631 B1 2/2003 Rosenchein et al. .......... 709/217
6,565,610 B1 5/2003 Wang et al.
6,567,846 B1 5/2003 Garg et al. .................... 709/218
6,567,936 B1 5/2003 Yang et al. ...................... 714/37
6,572,661 B1 6/2003 Stern .......................... 715/501.1
6,578,032 B1 6/2003 Chandrasekar et al.
6,584,464 B1 6/2003 Warthen ............................ 707/4
6,584,646 B2 7/2003 Fujita
6,594,658 B2 7/2003 Woods .............................. 707/5
6,606,625 B1 8/2003 Muslea et al. .................... 707/6
6,606,659 B1 8/2003 Hegli et al. ................... 709/225
6,609,123 B1 8/2003 Cazemier et al. ................. 707/4
6,636,742 B1 10/2003 Torkki et al.
6,643,641 B1 11/2003 Snyder ............................. 707/4
6,665,659 B1 12/2003 Logan ............................... 707/3
6,665,666 B1 12/2003 Brown et al. ..................... 707/5
6,665,837 B1 12/2003 Dean et al. ................ 715/501.1
6,675,159 B1 1/2004 Lin et al.
6,684,205 B1 1/2004 Modha et al.
6,693,651 B2 2/2004 Biebesheimer et al. ....... 345/837
6,704,726 B1 3/2004 Amouroux ........................ 707/4
6,738,767 B1 5/2004 Chung et al. ...................... 707/7
6,754,873 B1 6/2004 Law et al. .................. 715/501.1
6,763,496 B1 7/2004 Hennings et al.
6,799,176 B1 9/2004 Page ................................. 707/5
6,804,667 B1 10/2004 Martin .............................. 707/6
6,823,495 B1 11/2004 Vedula et al. ................. 715/805
6,832,218 B1 12/2004 Emens et al. ..................... 707/3
6,845,354 B1 1/2005 Kuo et al. ......................... 704/9
6,850,896 B1 2/2005 Kelman et al. .................. 705/10
6,868,411 B2 3/2005 Shanahan
6,873,982 B1 3/2005 Bates et al. ....................... 707/5
6,873,993 B2 3/2005 Charlesworth et al.
6,886,005 B2 4/2005 Davis ................................ 707/2
6,886,010 B2 4/2005 Kostoff ............................. 707/3
6,901,403 B1 5/2005 Bata et al. ..................... 707/101
6,904,429 B2 6/2005 Sako et al. ........................ 707/3
6,957,213 B1 10/2005 Yuret ............................... 707/4
6,963,880 B1 11/2005 Pingte et al. .................. 707/103
6,965,900 B2 11/2005 Srinivasa et al. .............. 707/102
7,003,506 B1 2/2006 Fisk et al. ......................... 707/1
7,003,522 B1 2/2006 Reynar et al. .................... 707/10
7,003,719 B1 2/2006 Rosenoff et al. ........... 715/501.1
7,007,228 B1 2/2006 Carro ............................ 715/513
7,013,308 B1 3/2006 Tunstall-Pedoe .......... 707/104.1
7,020,662 B2 3/2006 Boreham et al. ........... 707/104.1
7,043,521 B2 5/2006 Eitel ............................ 709/202
7,051,023 B2 5/2006 Kapur et al. ...................... 707/5
7,076,491 B2 7/2006 Tsao ............................ 707/100
7,080,073 B1 7/2006 Jiang et al. ........................ 707/7
7,080,085 B1 7/2006 Choy et al. .................... 707/101
7,100,082 B2 8/2006 Little et al. ...................... 714/26
7,143,099 B2 11/2006 Leeheler-Moore et al. .. 707/101
7,146,536 B2 12/2006 Bingham et al. ................ 714/26
7,158,980 B2 1/2007 Shen ............................ 707/100
7,162,499 B2 1/2007 Lees et al. ..................... 707/203
7,165,024 B2 1/2007 Glover et al. ..................... 704/9
7,174,504 B2 2/2007 Tsao ............................ 715/503
7,181,471 B1 2/2007 Ibuki et al. .................... 707/201
7,194,380 B2 3/2007 Barrow et al. ................ 702/181
7,216,073 B2 5/2007 Lavi et al. ......................... 704/9
7,233,943 B2 6/2007 Modha et al.
7,260,573 B1 8/2007 Jeh et al.
7,263,565 B2 8/2007 Tawara et al.
7,277,879 B2 10/2007 Varadarajan ...................... 707/1
7,302,646 B2 11/2007 Nomiyama et al. .......... 715/764
7,305,380 B1 12/2007 Hoelzle et al. .................... 707/3
7,325,160 B2 1/2008 Tsao .............................. 714/15
7,363,312 B2 4/2008 Goldsack ..................... 707/102
7,376,895 B2 5/2008 Tsao ............................ 715/517
7,398,461 B1 7/2008 Broder et al.
7,409,381 B1 8/2008 Steel et al. ........................ 707/3
7,412,078 B2 8/2008 Kim ............................. 382/105
7,418,736 B2 8/2008 Ghanea-Hercock
7,493,308 B1 2/2009 Bair, Jr. et al. .................... 707/3
7,493,317 B2 2/2009 Geva ................................ 707/3
7,587,387 B2 9/2009 Hogue .............................. 707/3
7,644,076 B1 1/2010 Ramesh et al.
7,672,971 B2 3/2010 Betz et al. ..................... 707/103
7,698,303 B2 4/2010 Goodwin et al. ............. 707/200
7,716,225 B1 5/2010 Dean et al.
7,756,823 B2 7/2010 Young et al. .................. 707/603
7,885,918 B2 2/2011 Statchuk ...................... 707/603
7,917,154 B2 3/2011 Fortescue et al.
7,953,720 B1 5/2011 Rohde et al.
8,024,281 B2 9/2011 Proctor et al.
8,065,290 B2 11/2011 Hogue
8,108,501 B2 1/2012 Birnie et al.
2001/0021935 A1 9/2001 Mills ............................ 707/513
2002/0038307 A1 3/2002 Obradovic et al. ........... 707/102
2002/0042707 A1 4/2002 Zhao et al. ........................ 704/9
2002/0065845 A1 5/2002 Naito et al. ................ 707/500.1
2002/0073115 A1 6/2002 Davis ........................ 707/500.1
2002/0083039 A1 6/2002 Ferrari et al. ..................... 707/1
2002/0087567 A1 7/2002 Spiegler et al. ............... 707/100
2002/0107861 A1 8/2002 Clendinning et al. ........ 707/101
2002/0169770 A1 11/2002 Kim et al. ......................... 707/5
2002/0174099 A1 11/2002 Raj et al. ........................... 707/1
2002/0178448 A1 11/2002 Te Kiefte et al. ............... 725/46
2002/0194172 A1 12/2002 Schrieber .......................... 707/4
2003/0018652 A1 1/2003 Heckerman et al. ....... 707/104.1
2003/0058706 A1 3/2003 Okamoto et al. ............. 365/200
2003/0069880 A1 4/2003 Harrison et al. .................. 707/3
2003/0078902 A1 4/2003 Leong et al. .................... 706/59
2003/0088607 A1 5/2003 Ruellan et al.
2003/0097357 A1 5/2003 Ferrari et al. ..................... 707/3
2003/0120675 A1 6/2003 Stauber et al. ................ 707/100
2003/0126152 A1 7/2003 Rajak ........................... 707/101
2003/0149567 A1 8/2003 Schmitz et al. ............... 704/270
2003/0149699 A1 8/2003 Tsao ............................ 707/100
2003/0154071 A1 8/2003 Shreve .............................. 704/9
2003/0167163 A1 * 9/2003 Glover et al. ..................... 704/9
2003/0177110 A1 9/2003 Okamoto et al. ................. 707/3
2003/0182310 A1 9/2003 Charnock et al. .......... 707/104.1

(56) References Cited

U.S. PATENT DOCUMENTS

2003/0195872 A1 10/2003 Senn ..... 707/3
2003/0195877 A1 10/2003 Ford et al. ..... 707/3
2003/0204481 A1 10/2003 Lau
2004/0003067 A1 1/2004 Ferrin ..... 709/223
2004/0015481 A1 1/2004 Zinda ..... 707/1
2004/0024739 A1 2/2004 Copperman et al. ..... 707/1
2004/0049503 A1 3/2004 Modha et al.
2004/0059726 A1 3/2004 Hunter et al. ..... 707/3
2004/0088292 A1 5/2004 Dettinger et al. ..... 707/4
2004/0107125 A1 6/2004 Guheen et al. ..... 705/7
2004/0122844 A1 6/2004 Malloy et al. ..... 707/102
2004/0122846 A1 6/2004 Chess et al. ..... 707/102
2004/0123240 A1 6/2004 Gerstl et al. ..... 715/513
2004/0128624 A1 7/2004 Arellano et al. ..... 715/530
2004/0153456 A1 8/2004 Charnock et al. ..... 707/10
2004/0167870 A1 8/2004 Wakefield et al. ..... 707/1
2004/0167907 A1 8/2004 Wakefield et al.
2004/0167911 A1 8/2004 Wakefield et al.
2004/0177015 A1 9/2004 Galai et al. ..... 705/35
2004/0177080 A1 9/2004 Doise et al. ..... 707/100
2004/0199923 A1 10/2004 Russek ..... 719/310
2004/0243552 A1 12/2004 Titemore et al. ..... 707/3
2004/0243614 A1 12/2004 Boone et al. ..... 707/102
2004/0255237 A1 12/2004 Tong ..... 715/501.1
2004/0268237 A1 12/2004 Jones et al. ..... 715/513
2005/0055365 A1 3/2005 Ramakrishnan et al.
2005/0076012 A1 4/2005 Manber et al. ..... 707/3
2005/0086222 A1 4/2005 Wang et al. ..... 707/5
2005/0086251 A1 4/2005 Hatscher et al. ..... 707/102
2005/0108630 A1 5/2005 Wasson et al. ..... 715/513
2005/0125311 A1 6/2005 Chidiac et al. ..... 705/28
2005/0149576 A1 7/2005 Marmaros et al. ..... 707/200
2005/0149851 A1 7/2005 Mittal ..... 715/501.1
2005/0187923 A1 8/2005 Cipollone ..... 707/3
2005/0188217 A1 8/2005 Ghanea-Hercock
2005/0240615 A1 10/2005 Barness et al. ..... 707/102
2005/0256825 A1 11/2005 Dettinger et al. ..... 707/1
2006/0036504 A1 2/2006 Allocca et al. ..... 705/26
2006/0047691 A1 3/2006 Humphreys et al.
2006/0047838 A1 3/2006 Chauhan ..... 709/230
2006/0064411 A1 3/2006 Gross et al. ..... 707/3
2006/0074824 A1 4/2006 Li ..... 706/20
2006/0074910 A1 4/2006 Yun et al. ..... 707/7
2006/0085465 A1 4/2006 Nori et al. ..... 707/101
2006/0112110 A1 5/2006 Maymir-Ducharme et al. ..... 707/100
2006/0123046 A1 6/2006 Doise et al. ..... 707/102
2006/0129843 A1 6/2006 Srinivasa et al.
2006/0152755 A1 7/2006 Curtis et al. ..... 358/1.15
2006/0224582 A1 10/2006 Hogue ..... 707/6
2006/0242180 A1 10/2006 Graf et al. ..... 707/101
2006/0248456 A1 11/2006 Bender et al. ..... 715/531
2006/0253418 A1 11/2006 Charnock et al. ..... 707/1
2006/0259462 A1 11/2006 Timmons ..... 707/3
2006/0277169 A1 12/2006 Lunt et al. ..... 707/3
2006/0293879 A1 12/2006 Zhao et al. ..... 704/9
2007/0005593 A1 1/2007 Self et al. ..... 707/6
2007/0005639 A1 1/2007 Gaussier et al. ..... 707/103
2007/0016890 A1 1/2007 Brunner et al. ..... 717/107
2007/0038610 A1 2/2007 Omoigui ..... 707/3
2007/0055656 A1 3/2007 Tunstall-Pedoe ..... 707/3
2007/0073768 A1 3/2007 Goradia ..... 707/104.1
2007/0094246 A1 4/2007 Dill et al. ..... 707/4
2007/0130123 A1 6/2007 Majumder ..... 707/3
2007/0143282 A1 6/2007 Betz et al. ..... 707/5
2007/0143317 A1 6/2007 Hogue et al. ..... 707/100
2007/0150800 A1 6/2007 Betz et al. ..... 715/500
2007/0198451 A1 8/2007 Kehlenbeck et al. ..... 706/50
2007/0198480 A1 8/2007 Hogue et al. ..... 707/3
2007/0198481 A1 8/2007 Hogue et al. ..... 707/3
2007/0198503 A1 8/2007 Hogue et al. ..... 707/5
2007/0198577 A1 8/2007 Betz et al. ..... 707/103
2007/0198598 A1 8/2007 Betz et al. ..... 707/201
2007/0198600 A1 8/2007 Betz ..... 707/201
2007/0203867 A1 8/2007 Hogue et al. ..... 706/48
2007/0208773 A1 9/2007 Tsao ..... 707/103
2007/0271268 A1 11/2007 Fontoura et al. ..... 707/6
2008/0104019 A1 5/2008 Nath
2009/0119255 A1 5/2009 Frank et al. ..... 707/3

FOREIGN PATENT DOCUMENTS

JP 2002-540506 A 11/2002 ..... G06F 17/30
JP 2003-281173 A 10/2003 ..... G06F 12/00
WO WO 01/27713 4/2001
WO WO 2004/114163 12/2004
WO WO 2006/104951 10/2006

OTHER PUBLICATIONS

Google Inc., Office Action, European Patent Application 06784449.8, Mar. 26, 2012, 7 pgs.
Betz, Examiner's Answer, U.S. Appl. No. 11/097,688, Jul. 8, 2010, 18 pgs.
Betz, Examiner's Answer, U.S. Appl. No. 11/394,414, Jan. 24, 2011, 31 pgs.
Betz, Notice of Allowance, U.S. Appl. No. 11/142,740, Apr. 16, 2009, 7 pgs.
Betz, Notice of Allowance, U.S. Appl. No. 11/142,765, Jul. 1, 2010, 14 pgs.
Betz, Notice of Allowance, U.S. Appl. No. 11/341,069, Sep. 8, 2008, 6 pgs.
Betz, Notice of Allowance, U.S. Appl. No. 12/939,981, Aug. 11, 2011, 7 pgs.
Betz, Notice of Allowance, U.S. Appl. No. 12/939,981, Apr. 26, 2011, 11 pgs.
Betz, Office Action, U.S. Appl. No. 11/142,740, Aug. 13, 2007, 12 pgs.
Betz, Office Action, U.S. Appl. No. 11/142,740, May 17, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/097,688, Mar. 18, 2009, 13 pgs.
Betz, Office Action, U.S. Appl. No. 11/097,688, Oct. 29, 2009, 11 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.

(56) References Cited

OTHER PUBLICATIONS

Betz, Office Action, U.S. Appl. No. 11/394,552, Mar. 13, 2009, 12 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. No. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Zhao, Notice of Allowance, U.S. Appl. No. 11/394,610, May 11, 2009, 15 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.

(56) References Cited

OTHER PUBLICATIONS

Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Dec. 29, 2009, 25 pgs.
Agichtein, E., et al., "Snowball Extracting Relations from Large Plain-Text Collections," Columbia Univ. Computer Science Dept. Technical Report CUCS-033-99, Dec. 1999, pp. 1-13.
Brill, E., et al., "An Analysis of the AskMSR Question-Answering System," Proceedings of the Conference of Empirical Methods in Natural Language Processing (EMNLP), Jul. 2002, pp. 257-264.
Brin, S., Extracting Patterns and Relations from the World Wide Web, 1999, 12 pages.
Brin, S., et al., "The Anatomy of a Large-cal Hypertextual Search Engine," 7th Int'l World Wide Web Conference, Brisbane, Australia, Apr. 14-18, 1998.
Bunescu, R., et al., "Using Encyclopedia Knowledge for Named Entity Disambiguation," Department of Computer Sciences, University of Texas, retrieved from internet Dec. 28, 2006, 8 pages.
Chang, C., et al., "IEPAD: Information Extraction Based on Pattern Discovery," WWW 10 '01, ACM, May 1-5, 2001, pp. 681-688.
Chu-Carroll, J., et al., "A Multi-Strategy and Multi-Source Approach to Question Answering," 2006, 8 pages.
Cover, T.M., et al., "Elements of Information Theory," Wiley-InterScience, New York, NY, 1991, 13 pages.
Craswell, et al., "Effective Site Finding Using Link Anchor Information," Sep. 2001, ACM, SIGIR '01, pp. 250-257.
Dean, J., et al., "MapReduce: Simplified Data Processing on Large Clusters," OSDI, 2004, pp. 1-13.
Dong, X., et al., "Reference Reconciliation in Complex Information Spaces," SIGACM-SIGMOD, 2005, 12 pages.
Downey, D., et al., "Learning Text Patterns for Web Information Extraction and Assessment," American Association for Artificial Intelligence, 2002, 6 pages.
Etzioni, O., et al., "Web-scale Information Extraction in KnowItAll (Preliminary Results)," WWW2004, ACM May 17-20, 2004, 11 pages.
Freitag, D., et al., "Boosted Wrapper Induction," American Association for Artificial Intelligence, 2000, 7 pages.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gigablast, Web/Directory, http://www.gigablast.com/?c=dmoz3, printed Aug. 24, 2010, 1 page.
Gilster, P., "Get Fast Answers, Easily," The New Observer, May 14, 2003, 2 pages.
Gray, R.M., "Entropy and Information Theory," Springer-Verlag, New York, NY, 1990, pp. 17-46.
Guha, R., "Object Co-Identification on the Semantic Web," WWW2004, ACM, May 17-22, 2004, 9 pages.
Guha, R., et al., "Disambiguating People in Search," World Wide Web Conference, May 17-22, 2004, 9 pages.
Haveliwala, T.H., "Topic-Sensitive PageRank," Proceeding of the 11th Int'l World Wide Web Conference, Honolulu, Hawaii, May 7-11, 2002.
Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.
Hsu, C. et al., "Finite-State Transducers for Semi-Structured Text Mining," IJCAI-99 Workshop on Text Mining: Foundations, Techniques and Applications, 1999, 12 pages.
Ilyas, I. et al., "Rank-aware Query Optimization," SIGMOD 2004, Jun. 13-18, 2004, 12 pages.
"Information Entropy," Wikipedia, the Free Encyclopedia, Retrieved on May 3, 2006, pp. 1-9.
"Information Theory," Wikipedia, the Free Encyclopedia,: Retrieved on May 3, 2006, pp. 1-12.
International Search Report and Written Opinion for International Application No. PCT/US2006/010965, mailed Jul. 5, 2006, 4 pages.
International Search Report and Written Opinion for International Application No. PCT/US2007/61156, mailed Feb. 11, 2008, 7 pages.
International Search Report and Written Opinion for International Application No. PCT/US2006/019807, mailed Dec. 18, 2006, 4 pages.
International Search Report and Written Opinion for International Application No. PCT/US2006/07639, mailed Sep. 13, 2006, 6 pages.
Jeh, G., et al., "Scaling Personalized Web Search," Proceedings of the 12th Int'l World Wide Web Conference, Budapest, Hungary, May 20-24, 2003.
Ji, H., et al., "Re-Ranking Algorithms for Name Tagging," Workshop on Computationally Hard Problems and Joint Inference in Speech and Language Processing, Jun. 2006, 8 pages.
Jones, R., et al., Bootstrapping for Text Learning Tasks, 1999, 12 pages.
Kolodner, "Indexing and Retrieval Strategies for Natural Language Fact Retrieval," Georgia Institute of Technology, ACM Transactions on Database Systems, vol. 8, No. 3, Sep. 1983, pp. 434-464.
Kosala, R., et al, "Web Mining Research: A Survey," SIGKDD Explorations, vol. 2, Issue 1, p. 1, Jul. 2000, 15 pages.
Kosseim, L., et al., "Answer Formulation for Question-Answering," 11 pages, Oct. 1, 2007.
Lin, J. et al., Question Answering from the Web Using Knowledge Annotation and Knowledge Mining Techniques, CIKM '03, Nov. 3-8, 2003, 8 pages.
Liu, B. et al., "Mining Data Records in Web Pages," Conference 2000, ACM, 2000, pp. 1-10.
MacKay, D.J.C., "Information Theory, Inference and Learning Algorithms," Cambridge University Press, 2003, pp. 22-33, 138-140.
Mann, G. et al., "Unsupervised Personal Name Disambiguation," Proceedings of the Seventy Conference on Natural Language Learning at HLT-NAACL, 2003, 8 pages.
McCallum, A., et al., "Object Consolidation by Graph Partitioning with a Conditionally-Trained Distance Metric,"SIGKDD 03, ACM, Aug. 24-27, 2003, 6 pages.
Mihalcea, R., et al., PageRank on Semantic Networks, with Application to Word Sense Disambiguation, Proceedings of the 20th International Conference on Computational Linguistics, Aug. 23-27, 2004, 7 pages.
Mihalcea, R., et al., "TextRank: Bringing Order into Texts," Proceedings of the Conference on Empirical Methods in Natural Language Processing, Jul. 2004, 8 pages.
Nyberg, E. et al., "The JAVELIN Question-Answering System at TREC 2003: A Multi-Strategy Approach with Dynamic Planning," TREC 2003, Nov. 18-21, 2003, 9 pages.
Page, L., et al., "The PageRank Citation Ranking: Bringing Order to the Web.," Stanford Digital Libraries Working Paper, 1998.
Pawson, D., "Sorting and Grouping," www.dpawson.co.uk/xsl/sect2/N6280.html>, Feb. 7, 2004, pp. 1-19.
Prager, J. et al., "IBM's Piquant in TREC2003," 2003, 10 pages.
Prager, J., et al., "Question Answering Using Constraint Satisfaction: QA-by-Dossier-with-Constraints," 2004, 8 pages.
Ramakrishnan, G., et al., "Is Question Answering an Acquired Skill?" WWW2004, ACM May 17, 2004, pp. 111-120.
Richardson, M., et al., "Beyond Page Rank: Machine Learning for Static Ranking," International World Wide Web Conference Committee, May 23, 2006, 9 pages.
Richardson, M., et al., "The Intelligent Surfer: Probabilistic Combination of Link and Content Information in PageRank," Advances in Neural Information Processing Systems, vol. 14, MIT Press, Cambridge, MA, 2002.

(56) References Cited

OTHER PUBLICATIONS

Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, July, Oct. 1948, pp. 1-55.
Sun Microsystems, "Attribute Names," http://java.sun.com/products/jndi/tutorial/basics/directory/attrnames.html>, Feb. 17, 2004, pp. 1-2.
Wang, et al., "Combining Link and Contents in Clustering Web Search Results to Improve Information Interpretation," 2002, the University of Tokyo, pp. 1-9.
Zhao, S. et al., "Corroborate and Learn Facts from the Web," KDD'07, Aug. 12-15, 2007, 9 pages.
Ogden, W. et al., "Improving Cross-Language Text Retrieval with Human Interactions," Proceedings of the 33rd Hawaii International Conference on System Sciences, IEEE 2000, Jan. 2000, 9 pages.
Plaisant, C. et al. "Interface and Data Architecture for Query Preview in Networked Information Systems," ACM Transaction on Information Systems, vol. 17, Issue 3, Jul. 1999, 28 pages.
Wirzenius, L., "C Preprocessor Trick for Implementing Similar Data Types," Jan. 17, 2000, pp. 1-9.
Inaba (Applicant), 2008-504204, Mar. 24, 2006, Japanese Office Action mailed Oct. 12, 2011, 4 pgs.
Betz, Final Office Action, U.S. Appl. No. 11/394,552, Oct. 21, 2013, 22 pgs.
Betz, Notice of Allowance, U.S. Appl. No. 11/097,688, Nov. 19, 2013, 17 pgs.
Betz, Office Action, U.S. Appl. No. 11/394,552, Apr. 23, 2013, 21 pgs.
Google Inc., Office Action, CA 2603085, Sep. 18, 2012, 2 pgs.
Hogue, Notice of Allowance, U.S. Appl. No. 13/549,361, Oct. 2, 2013, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Nov. 12, 2013, 9 pgs.
Hogue, Notice of Allowance, U.S. Appl. No. 13/603,354, Jun. 26, 2013, 8 pgs.
Hogue, Office Action, U.S. Appl. No. 13/549,361, Mar. 6, 2013, 13 pgs.
Hogue, Office Action, U.S. Appl. No. 13/603,354, Jan. 9, 2013, 5 pgs.
Laroco, Notice of Allowance, U.S. Appl. No. 13/364,244, Aug. 6, 2013, 6 pgs.
Laroco, Office Action, U.S. Appl. No. 13/364,244, Jan. 30, 2013, 8 pgs.
Shamsi, Final Office Action, U.S. Appl. No. 13/171,296, Nov. 4, 2013, 29 pgs.
Shamsi, Office Action, U.S. Appl. No. 13/171,296, Apr. 3, 2013, 7 pgs.
Zhao, Office Action, U.S. Appl. No. 11/941,382, Sep. 27, 2013, 30 pgs.
Laroco Jr., Office Action, U.S. Appl. No. 13/364,244, Dec. 19, 2013, 5 pages.

* cited by examiner

202
Source Document
Attribute : Value
Attribute : Value
220
220
204
204
Linking Document 1
<A destination=location parameters>text 1</A>
208
210
212
214
216
218
206
Linking Document P
<A destination=location parameters>text P</A>
206

Object 400
Object ID
402
Fact ID
Attribute
Value
Link
Metrics
Sources
Agent
410
412
414
416
418
420
422
404
404
406
408
Name
424
Property
426

IDENTIFYING THE UNIFYING SUBJECT OF A SET OF FACTS

RELATED APPLICATIONS

This application is a continuation of U.S. application Ser. No. 12/939,981, filed Nov. 4, 2010 now U.S. Pat. No. 8,078,573, entitled "Identifying the Unifying Subject of a Set of Facts," which was a continuation of U.S. application Ser. No. 11/142,765, filed May 31, 2005 now U.S. Pat. No. 7,831,545, entitled "Identifying the Unifying Subject of a Set of Facts," now U.S. Pat. No. 7,831,545, each of which is incorporated herein by reference in its entirety.

This application is potentially related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,690, "Selecting the Best Answer to a Fact Query from Among a Set of Potential Answers," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005;

U.S. patent application Ser. No. 11/024,784, "Supplementing Search Results with Information of Interest," filed on Dec. 30, 2004;

U.S. patent application Ser. No. 11/142,740, "Merging Objects in a Facts Database," filed on May 31, 2005;

U.S. patent application Ser. No. 11/142,853, "Learning Facts from Semi-Structured Text," filed on May 31, 2005;

U.S. patent application Ser. No. 11/142,748, "System for Ensuring the Internal Consistency of a Fact Repository," filed on May 31, 2005.

TECHNICAL FIELD

The disclosed embodiments relate generally to fact databases. More particularly, the disclosed embodiments relate to identifying a subject for a source document and facts included in the document.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." The factual information included in web pages may be extracted and stored in a fact database.

When extracting facts, it is useful to know the subject with which a web page is associated, because any facts extracted from the web page are more likely than not associated with the same subject. If the subject is not known, not only are the extracted facts less useful, organization and management of the extracted facts in the fact database may become more complicated. However, the manner of labeling the subject may vary. For example, some web pages may indicate their subject in the main text of the web page, while some other web pages may indicate their subject in the HTML title text. The variety of manners of labeling the subject making the process of identifying the subject difficult.

SUMMARY

According to an aspect of the invention, a method of processing a set of documents includes identifying a source document; identifying a set of linking documents that include links, with anchor text, to the source document; generating a set of candidate labels based on the respective anchor texts; selecting a first label of the candidate labels according to first predefined criteria; and associating the selected first label with the source document.

BRIEF DESCRIPTION OF THE DRAWINGS

Like reference numerals refer to corresponding parts throughout the drawings.

DESCRIPTION OF EMBODIMENTS

A subject label may be identified for a source document and a set of facts extracted from the source document. A set of candidate labels are generated based on anchor texts of links to the source document that are included in one or more linking documents. One of the candidate labels is selected to be the label for the subject of the source document and of facts extracted from the source document. Additional candidate labels may be selected as secondary labels for the subject of the source document and of the facts extracted from the source document.

Figure 1:
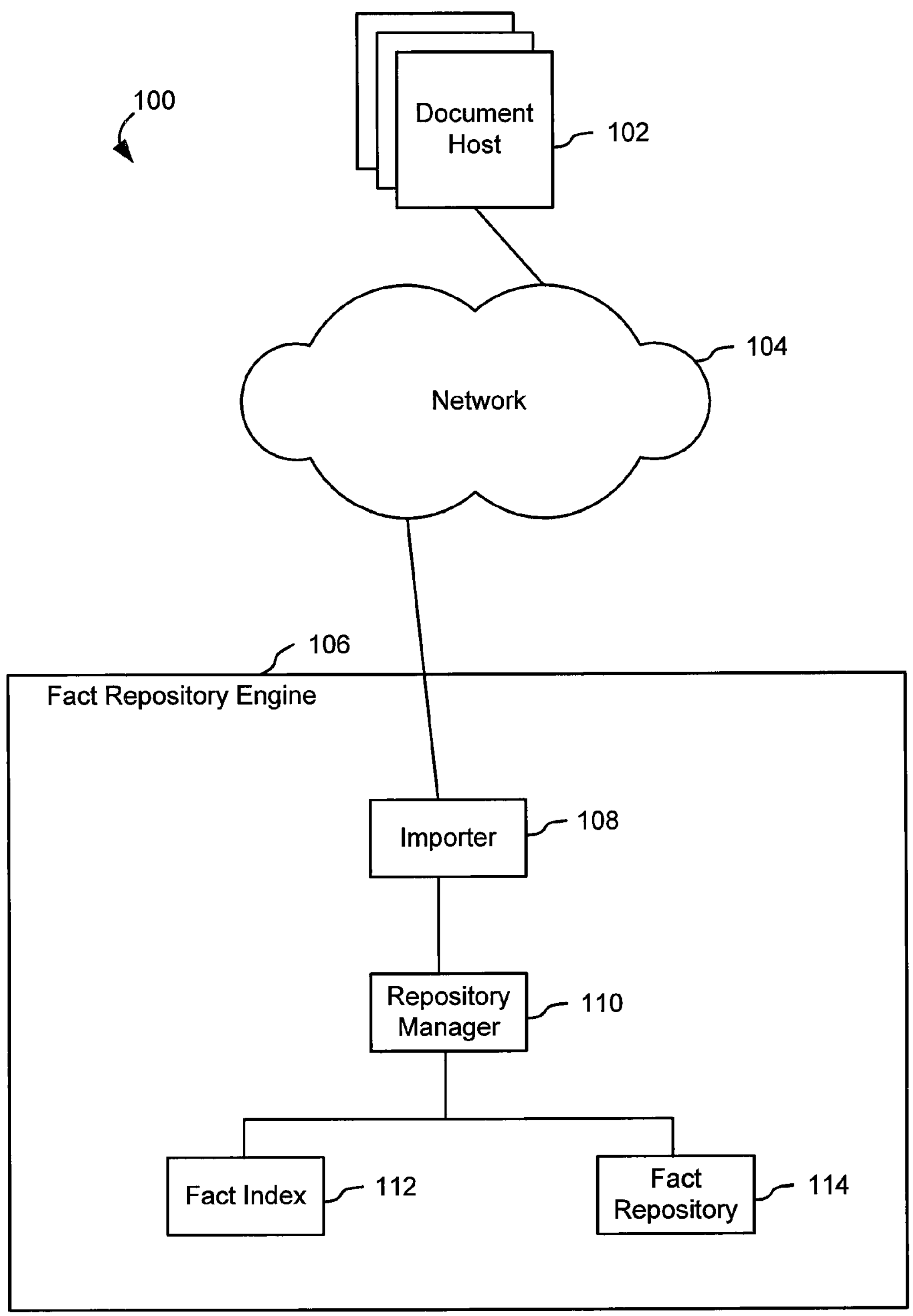
FIG. 1 illustrates a network, according to some embodiments of the invention.

FIG. 1 illustrates a network 100, according to some embodiments of the invention. Network 100 includes one or more document hosts 102 and a fact repository engine 106. The network 100 also includes one or more networks 104 that couple these components.

The document hosts 102 store documents and provide access to documents. A document may be any machine-readable data including any combination of text, graphics, multimedia content, etc. In some embodiments, a document may be a combination of text, graphics and possibly other forms of information written in the Hypertext Markup Language (HTML), i.e., a web page. A document may include one or more hyperlinks to other documents. A document may include one or more facts within its contents. A document stored in a document host 102 may be located and/or identified by a Uniform Resource Locator (URL), or Web address, or any other appropriate form of identification and/or location.

Each document may also be associated with a page importance metric. The page importance metric of a document measures the importance, popularity or reputation of the document relative to other documents. In some embodiments, the page importance metric is the PageRank of the document. For more information on the PageRank metric and its computation, see, for example, Page et al., "The PageRank citation ranking: Bringing order to the web," Stanford Digital Libraries Working Paper, 1998; Haveliwala, "Topic-sensitive PageRank," 11th International World Wide Web Conference, Honolulu, Hi., 2002; Richardson and Domingos, "The Intelligent Surfer: Probabilistic Combination of Link and Content Information in PageRank," volume 14. MIT Press, Cambridge, Mass., 2002; and Jeh and Widom, "Scaling personalized web search," 12th International World Wide Web Conference, Budapest, Hungary, May 20-24, 2002; Brin and Page, "The Anatomy of a Large-Scale Hypertextual Search Engine," 7th International World Wide Web Conference, Brisbane, Australia, 1998; and U.S. Pat. No. 6,285,999, each of which is hereby incorporated by reference in its entirety as background information.

The fact repository engine 106 includes an importer 108, a repository manager 110, a fact index 112, and a fact repository 114. The importer 108 extracts factual information from documents stored on document hosts 102. The importer 108 analyzes the contents of the documents stored in document host 102, determines if the contents include factual information and the subject or subjects with which the factual information are associated, and extracts any available factual information within the contents.

The repository manager 110 processes facts extracted by the importer 108. The repository manager 110 builds and manages the fact repository 114 and the fact index 112. The repository manager 110 receives facts extracted by the importer 108 and stores them in the fact repository 114. The repository manager 110 may also perform operations on facts in the fact repository 114 to "clean up" the data within the fact repository 114. For example, the repository manager 110 may look through the fact repository 114 to find duplicate facts (that is, facts that convey the exact same factual information) and merge them. The repository manager 110 may also normalize facts into standard formats. The repository manager 110 may also remove unwanted facts from the fact repository 114, such as facts meeting predefined objectionable content criteria (e.g., facts related to pornographic content).

The fact repository 114 stores factual information extracted from a plurality of documents that are located on the document hosts 102. In other words, the fact repository 114 is a database of factual information. A document from which a particular fact may be extracted is a source document (or "source") of that particular fact. In other words, a source of a fact includes that fact within its contents. Source documents may include, without limitation, web pages. Within the fact repository 114, entities, concepts, and the like for which the fact repository 114 may have factual information stored are represented by objects. An object may have one or more facts associated with it. Each object is a collection of facts. In some embodiments, an object that has no facts associated with it (an empty object) may be viewed as a non-existent object within the fact repository 114. Within each object, each fact associated with the object is stored as an attribute-value pair. Each fact also includes a list of source documents that include the fact within its contents and from which the fact was extracted. Further details about objects and facts in the fact repository are described below, in relation to FIG. 4.

The fact index 112 provides an index to the fact repository 114 and facilitates efficient lookup of information in the fact repository 114. The fact index 112 may index the fact repository 114 based on one or more parameters. For example, the fact index 112 may have an index that maps unique terms (e.g., words, numbers and the like) to records or locations within the fact repository 114. More specifically, the fact index 112 may include entries mapping every term in every object name, fact attribute and fact value of the fact repository to records or locations within the fact repository.

It should be appreciated that each of the components of the fact repository engine 106 may be distributed over multiple computers. For example, the fact repository 114 may be deployed over N servers, with a mapping function such as the "modulo N" function being used to determine which facts are stored in each of the N servers. Similarly, the fact index 112 may be distributed over multiple servers, and the importer 108 and repository manager 110 may each be distributed over multiple computers. However, for convenience of explanation, we will discuss the components of the fact repository engine 106 as though they were implemented on a single computer.

Figure 2:
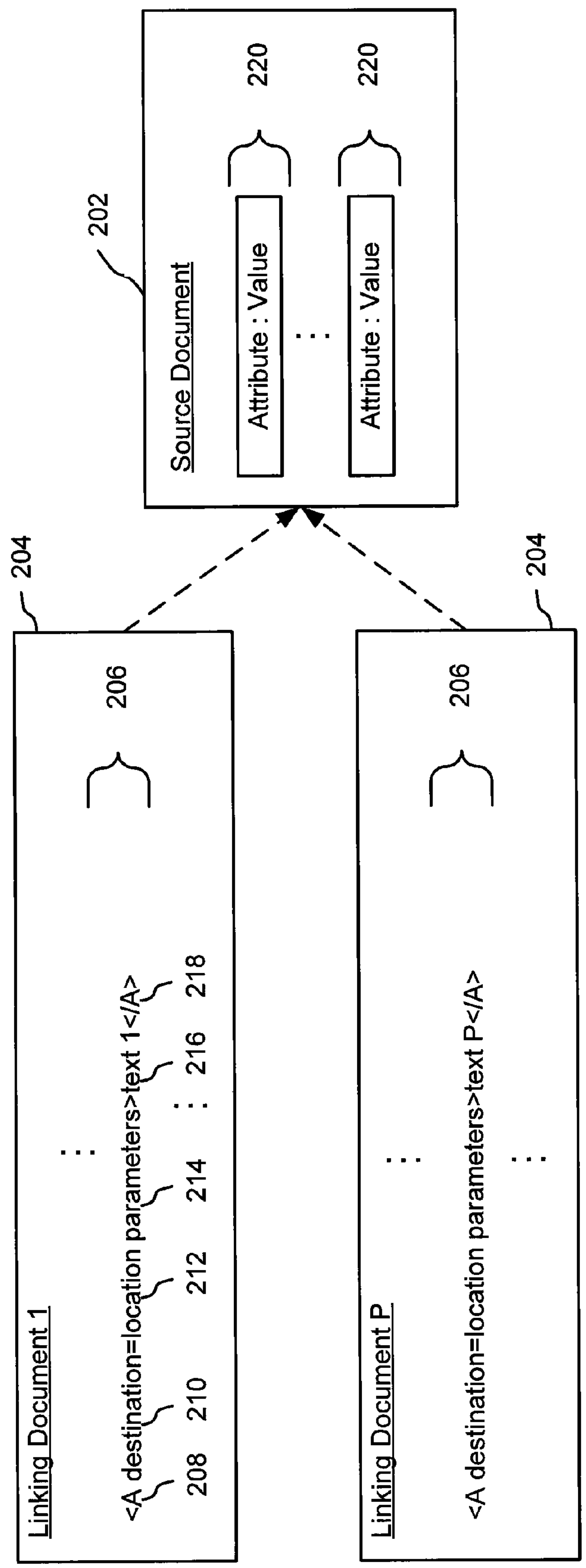
FIG. 2 is a block diagram illustrating a source document and linking documents that include links to the source document, according to some embodiments of the invention.

FIG. 2 is a block diagram illustrating a source document and linking documents that include links to the source document, according to some embodiments of the invention. The source document 202 is stored in a document host 102. The source document 202 is identified by the fact repository engine 106 as a document that includes factual information, within the contents of the source document 202, which may be extracted. The source document 202 may include content such as text, graphics, multimedia, etc. However, the content in the source document 202 that is of interest to the fact repository engine 106 is content that conveys factual information. The factual information in the source document 202 may be represented as one or more attribute-value pairs 220.

One or more linking documents 204, which are stored in one or more document hosts 102, may link to the source document 202. The links to the source document 202 are hyperlinks 206 within the linking documents 204. A linking document may include content such as text, graphics, multimedia, etc. A linking document may also include hyperlinks to documents other than to the source document 202. However, the hyperlink that is of interest to the fact repository engine 106 is the hyperlink to the source document 202.

A hyperlink 206 (or "link") includes a starting anchor tag 208, which includes one or more parameters (or markup attributes), and an ending anchor tag 218. The starting and ending anchor tags define the hyperlink. A destination attribute 210 indicates that the hyperlink 206 is a source anchor that links to a destination document. The location value 212 of the destination attribute 210 specifies the location and/or identity of the destination document to which the hyperlink links. In FIG. 2, the destination document is the source document 202, and thus the location value 212 of each hyperlink 206 is the location or identifier of the source document 202. The starting anchor tag 208 may also include one or more additional parameters 214.

Between the starting anchor tag 208 and the ending anchor tag 218 is the anchor text 216. The anchor text 216 is textual content in the linking document 204 that becomes the source anchor to the destination document based on its location between the starting anchor tag 208 and the ending anchor tag 218. In other words, the anchor text 216 is the text in the linking document that becomes the hyperlink. The anchor text 216 may be of any length.

The anchor text 216 is text that is to be rendered for presentation to a user. The anchor text may be rendered by the client application differently from other text rendered for presentation to the user, in order to differentiate the hyperlink anchor text from normal text. For example, the anchor text may be underlined and/or have a different font color than normal text after rendering. The hyperlink, if clicked by a user, triggers a request (e.g., an HTTP request) for the source document.

In some embodiments, the linking document 204 is a document written in HTML. In a linking document written in HTML, there is text in the linking document that is rendered for presentation to a user when the linking document is rendered in a client application, such as a web browser. There is also text that "marks up" the text to be rendered but is otherwise invisible when the linking document is rendered by a client application, such as a web browser. These markup texts specify how the text that is to be rendered for presentation to a user is to be rendered in the client application. The markup text includes HTML tags and parameters associated with the HTML tags. In a source document 202 written in HTML, the starting anchor tag 208 is the HTML tag "<A . . . >," and the ending anchor tag 218 is the HTML tag "</A>". The destination attribute 210 is the HTML attribute "href," that is included in the starting anchor tag "<A . . . >." The location value 212 of the destination attribute is the URL of the source document. The URL in the location value 212 may be an absolute URL or a relative URL. For example, a hyperlink 206 to a source document 202, where the starting anchor tag does not include additional parameters other than the destination attribute, may be "<A href="http://www xyz.com/abc.html">ABC</A>." In this example, "<A href="http://www.xyz.com/abc.html">" is the starting anchor tag with a destination attribute and a location value, "</A>" is the ending tag, and "ABC" is the anchor text of the hyperlink.

Figure 3A:
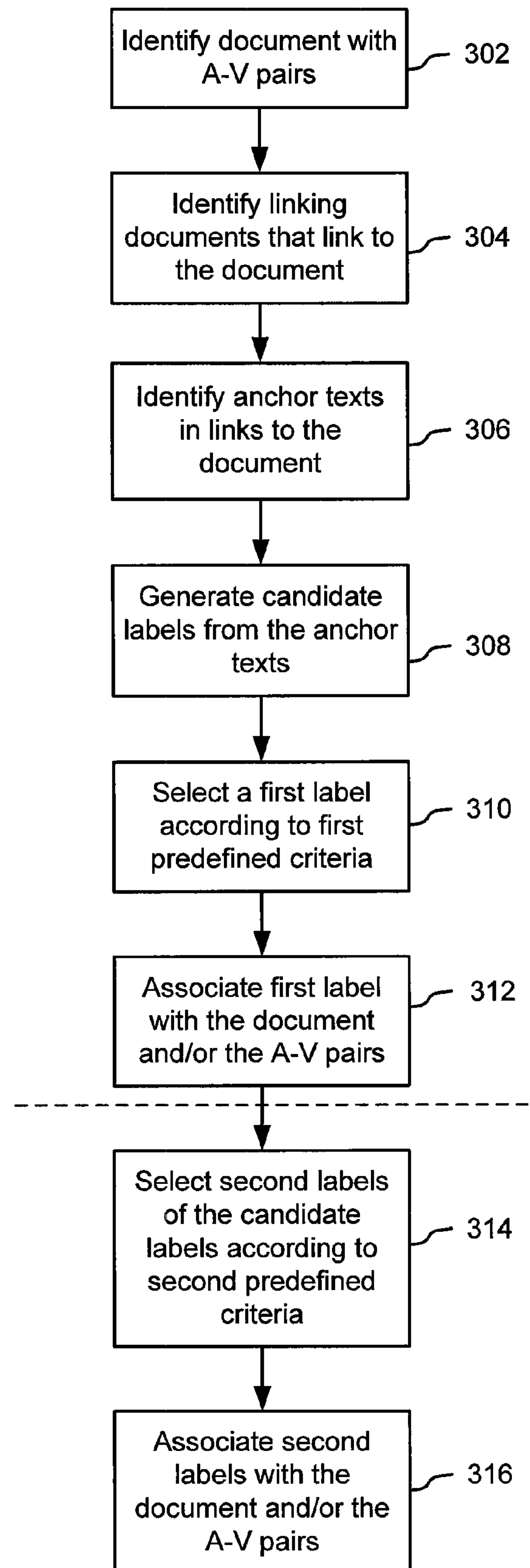
FIG. 3A is a flow diagram illustrating a process for associating a label with a source document and/or facts (as represented by attribute-value pairs) extracted from the source document, according to some embodiments of the invention.

FIG. 3A is a flow diagram illustrating a process for associating a label with a source document and/or facts extracted from the source document, according to some embodiments of the invention. A source document that includes one or more facts identifiable as attribute-value pairs (hereinafter "A-V pairs") is identified (302). One or more linking documents that include links to the source document are identified (304). In some embodiments, a search engine may be queried to search for linking documents that include a link to the source document. In some other embodiments, one or more link maps may be consulted. The one or more link maps map the linkage between one or more documents stored in document hosts 102. The link maps may be located within the fact repository engine 106 or located at a search engine that is accessible to the fact repository engine 106.

Anchor texts of the links to the source document are identified (306). From the identified linking documents, the anchor texts of the links to the source documents are identified. Each linking document is parsed to find the starting and ending anchor tags that define the hyperlink to the source document. The anchor text between the tags is identified and extracted.

One or more candidate labels are generated from the extracted anchor texts (308). In some embodiments, the label generation includes converting the extracted anchor texts to a canonical form by applying a set of transformations to the extracted anchor texts. For instance, the transformation may include removing punctuation marks from the anchor texts and converting them to all lower case characters. In some other embodiments, additional processing may be performed on the anchor texts to generate the candidate labels in canonical form. For example, the anchor texts may be processed to remove from anchor texts words that tend to be not useful as subject labels, or words of low value, such as "click here." If an anchor text is made up entirely of low value words, it may be the case that the entire anchor text is eliminated and no candidate label is generated from that anchor text. Each generated candidate label is distinct from another; two anchor texts that are exactly the same (before or after conversion to canonical form) will yield one candidate label.

A first label is selected from the candidate labels according to one or more first predefined criteria (310). The first predefined criteria are defined such that the selected first label is most representative of the anchor texts associated with the hyperlinks to the source document. Further details regarding the selection of the first label are described below, in relation to FIGS. 3B and 3C.

The selected first label is associated with the source document and/or any A-V pairs extracted from the source document (312). Before the first label is associated with the source document and/or A-V pairs, the first label may be processed to more resemble the corresponding anchor text (e.g., by reversing one or more of the transformations used to convert the anchor text to canonical form, or by applying a subset of these transformations to the original anchor text). The selected label becomes the label for the subject of the source document and/or of any A-V pairs extracted from the source document. Optionally, one or more second labels may be selected from the candidate labels based on one or more second predefined criteria (314). The second labels may also be associated with the source document and/or the A-V pairs (316).

In some embodiments, the selected first label, and any selected second labels, are associated with the source document and/or the A-V pairs extracted from the source document, by adding an entry or value to a corresponding data structure. In the context of the facts database used in some embodiments, the selected first label, and any selected second labels, are associated with the extracted A-V pairs by adding these labels as names to the object data structure 400 (FIG. 4) in which the A-V pairs are stored. Each name of an object is represented by either a fact entry 404 having a "name" attribute, or by a name entry. In some embodiments, the fact entry in which a selected label is stored may include in its sources field 420 (FIG. 4) the URL or identifier of the source document. In other words, the selected label is attributed to the source document. In some other embodiments, the fact entry in which a selected label is stored may include in its sources field 420 (FIG. 4) the URL or identifier of the linking document. In other words, the selected label is attributed to the linking document. In further other embodiments, the fact entry in which a selected label is stored may include in its sources field 420 (FIG. 4) the URLs or identifiers of the source document and the linking document. In other words, the selected label is attributed to both the source document and the linking document.

Figure 3B:
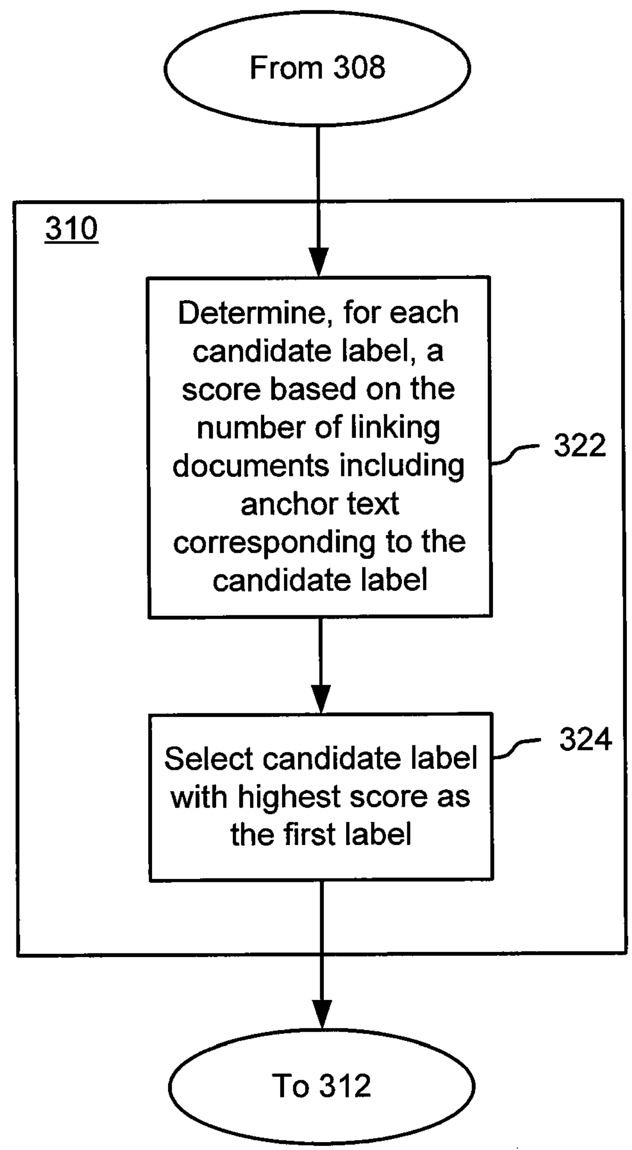
FIGS. 3B and 3C are flow diagrams illustrating processes for selecting a label to associate with a source document and/or attribute-value pairs, according to some embodiments of the invention.

FIG. 3B illustrates one process for selecting a label to associate with a source document and/or A-V pairs, according to some embodiments of the invention. In some embodiments, the first predefined criterion for selection of the first label is based on the number of linking documents that have links, to the source document, with anchor text corresponding to the candidate label. A score for each candidate label may be determined based on how many linking documents include a link, to the source document, with the corresponding anchor text. At block 310 of FIG. 3A (coming from block 308), a score is determined for each candidate label (322). In some embodiments, the score is simply a count of how many linking documents include a link, to the source document, with anchor text corresponding to the respective candidate label. For example, if three linking documents include a link to the source document with anchor text A, then the score of the candidate label corresponding to anchor text A is 3. The score is, in a sense, a vote for the particular candidate label by linking documents having links to the source document. In some embodiments, anchor text corresponding to a candidate label (or candidate label corresponding to anchor text) means that the anchor text, after applying a predefined set of transformations (e.g., removing punctuation marks and converting to all lower case), matches the candidate label exactly. In some other embodiments, the match required for the correspondence may be less stringent. For example, the candidate label may be a proper substring of the anchor text.

In some embodiments, the score may be weighted by the page importance metrics of the linking documents having the links to the source document. This may help bias the vote toward candidate labels generated from anchor texts extracted from more important documents. Thus, each "vote" in the score is multiplied by the page importance metric of the linking document corresponding to the vote. The weighted score is the sum of the page importance metrics of the linking documents that include the link, to the source document, with the corresponding anchor text:

$$\text{Score(candidate label)} = \sum_{\text{linking documents}} P(\text{linking document}),$$

where P(linking document) is the page importance metric of a linking document that includes a link, to the source document, with anchor text corresponding to the candidate label.

The candidate label with the highest score is selected as the first label (324). The process proceeds to block 312, as shown in FIG. 3A. If second labels are to be selected at block 314, the second predefined criteria are based on the scores of the candidate labels. In some embodiments, the second predefine criteria are that the any candidate label (not including the already selected first label) with a score above a predefined threshold may be selected as a second label. The predefined threshold may be a fixed score or a fixed percentage of the score of the selected first label. In some other embodiments, the second predefined criteria are that the M candidate labels with highest scores (not including the selected first label) are selected as second labels, where M is a fixed positive integer.

Figure 3C:
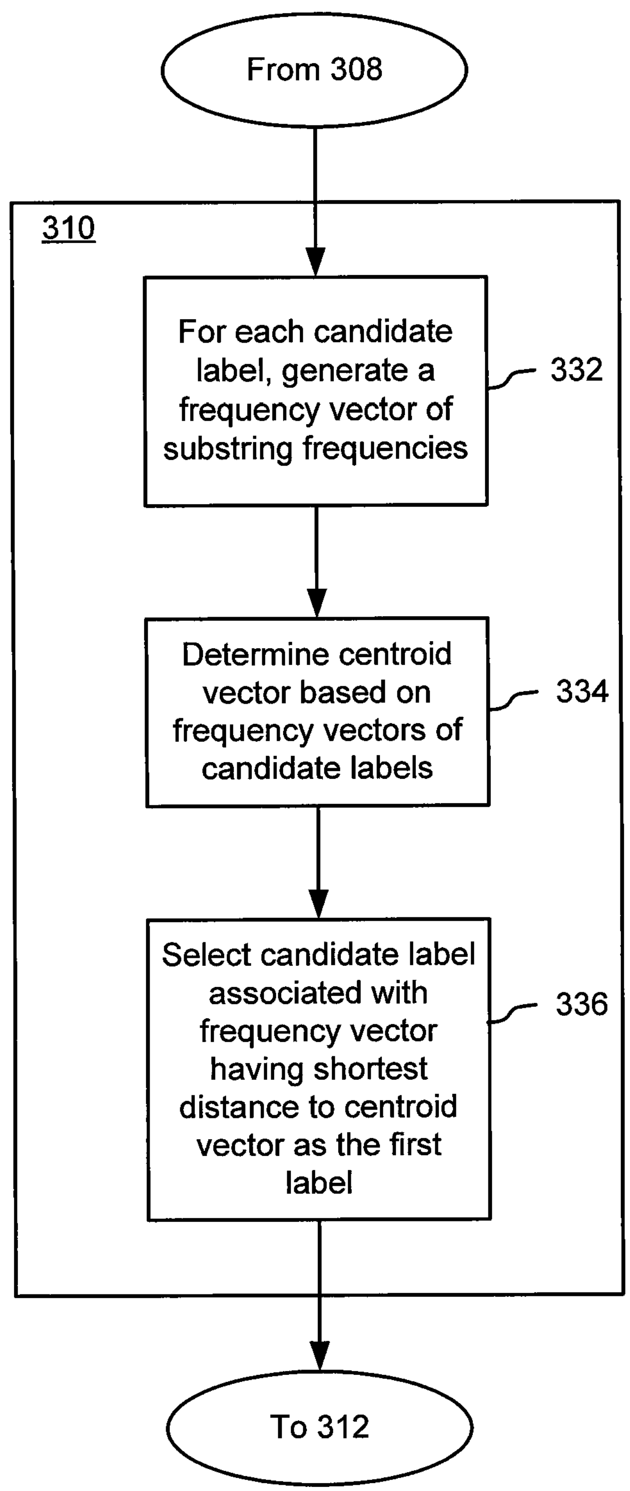

FIG. 3C illustrates another process for selecting a label to associate with a source document and/or attribute-value pairs, according to some embodiments of the invention. In some embodiments, a first label may be selected based on a first predefined criterion of highest similarity to a "center" of the candidate labels generated for the source document. To determine the "center" of the candidate labels and to determine the similarity to the "center," the candidate labels are embedded into a vector space.

At block 310 of FIG. 3A (coming from block 308), a frequency vector is generated for each candidate label (332). The frequency vector is a vector of numbers of occurrences (frequencies) of n-grams in a candidate label. An n-gram is an n-character substring of a given string, disregarding any white spaces. Thus, if the given string is "good day," then the 3-grams (3-character substrings) of "good day" are "goo," "ood," "odd," "dda," and "day." In other words, each n-gram is formed from an n-character sliding window along the length of the candidate label. The frequency vector of a candidate label includes frequencies of all possible n-grams. If the candidate labels are assumed to only include letters and no numbers or other punctuation, the frequency vector of a candidate label is a $26^n$ dimensional space vector. For example, a frequency vector of 3-grams, a $26^3$ dimensional space vector, has frequencies of "aaa" through "zzz" in the candidate label. If the candidate labels can include numerical digitals (0 to 9) and lower case letters, the frequency vector is a $36^3$ dimensional space vector. In either case, most frequencies in a frequency vector are 0 and the only non-zero frequencies are the frequencies of n-grams that actually occur in the candidate label.

For each candidate label, n-grams of the candidate label are identified and frequencies of the n-grams within that candidate label are determined. A frequency vector for that candidate label is generated based on the determined frequencies. In some embodiments, the n-grams are 5-grams (i.e., a 5-character sliding window).

After a frequency vector is generated for each candidate label, a centroid vector is determined (334). The centroid vector represents a "center," an "average" of sorts, of the frequency vectors of the candidate labels. In some embodiments, the centroid vector is determined by normalizing the generated frequency vectors of the candidate labels (i.e., converting each frequency vector into a unit vector), adding the normalized frequency vectors, and normalizing the resulting vector sum. Because the centroid vector is a normalization of the resulting vector sum, the length of the centroid vector is 1. In some embodiments, each frequency vector, after normalization but before the addition, may be weighted (i.e., scalar multiplication) by the sum of the page importance metrics of linking documents (i.e., documents which have links to the source document) with anchor text corresponding to the candidate label associated with each respective frequency vector.

The candidate label with the corresponding frequency vector that has the shortest distance to the centroid vector is identified (336). That is, the candidate label corresponding to the frequency vector that is closest to the centroid vector is identified. The candidate label with the closest frequency vector is the most similar to the "center," represented by the centroid vector. In some embodiments, the closeness of a frequency vector to the centroid vector is measured by the cosine distance (also called the cosine similarity):

$$\cos\theta = \frac{f \cdot c}{\|f\| \times \|c\|},$$

where f·c is the dot product of frequency vector f and the centroid vector c, ||f|| is the length of frequency vector f, ||c|| is the length of the centroid vector c (which is 1 since the centroid vector is already normalized, as described above), θ is an angle between frequency vector f and the centroid vector c, and cos θ (the cosine of angle θ) is the cosine distance between the two vectors. A smaller θ (i.e., as θ approaches 0) means that f and c are closer to each other. Cos 0 is equal to 1, which is the largest positive number that cos 0 can ever be. A frequency vector f that is closest to the centroid vector c will yield the largest positive cos θ (i.e., nearest to 1). Thus, the frequency vector that has the shortest distance to the centroid vector is the frequency vector that has the largest positive cosine distance value with respect to the centroid vector.

The candidate label with the frequency vector that is closest to the centroid vector is selected as the first label (336). The process proceeds to block 312, as shown in FIG. 3A. If second labels are to be selected at block 314, the second predefined criteria are based on the cosine distances of the frequency vectors of the candidate labels. In some embodiments, the second predefine criteria are that the any candidate label (not including the already selected first label) with a cosine distance above a predefined threshold may be selected as a second label. The predefined threshold may be a fixed cosine distance value or a fixed percentage of the cosine distance of the selected first label. In some other embodiments, the second predefined criteria are that the L candidate labels with highest positive cosine distances (not including the selected first label) are selected as second labels, where L is a fixed positive integer.

Figure 4:
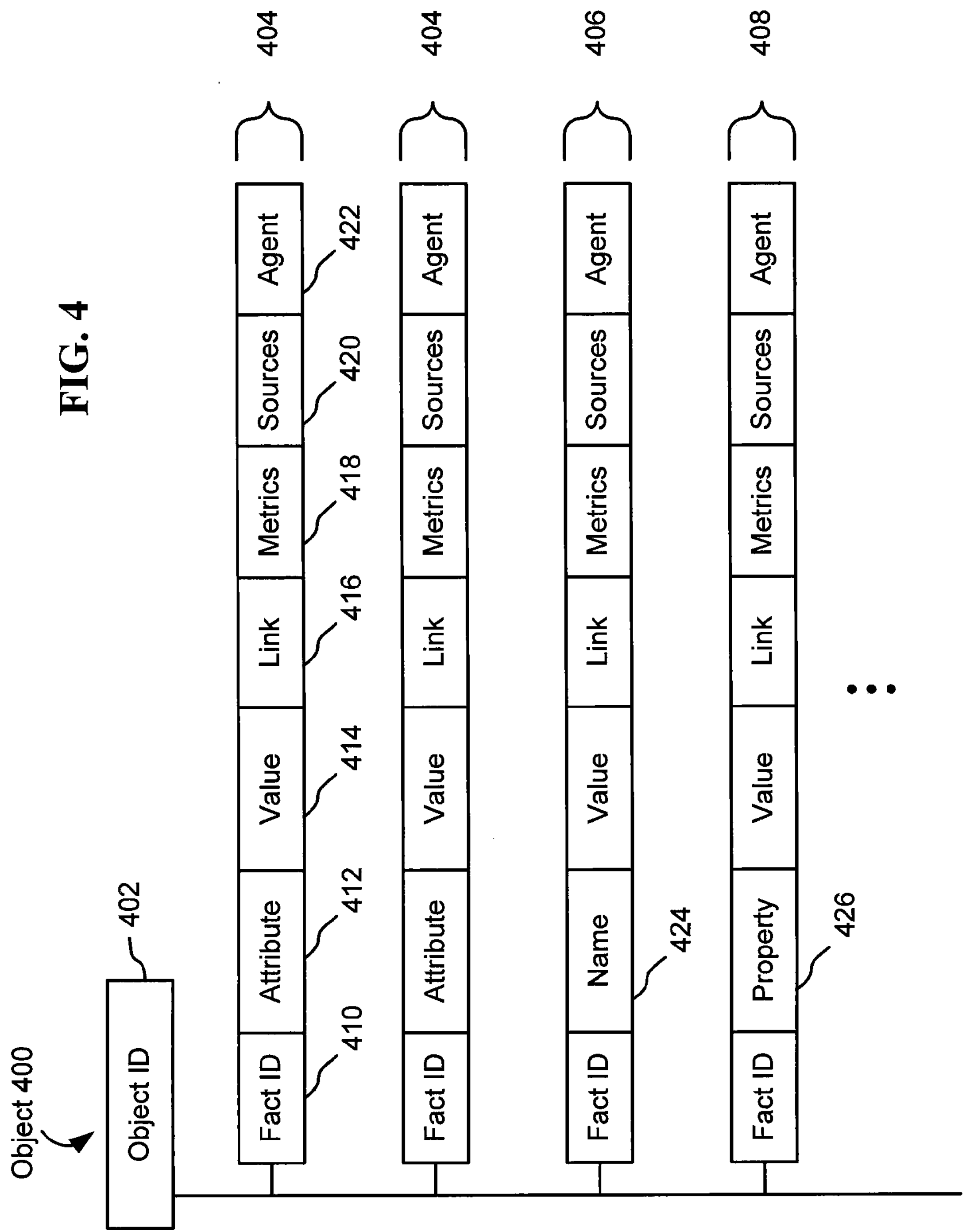
FIG. 4 illustrates a data structure for an object and associated facts in a fact repository, according to some embodiments of the invention.

FIG. 4 illustrates an exemplary data structure for an object within the fact repository 114, according to some embodiments of the invention. As described above, the fact repository 114 includes objects, each of which may include one or more facts. Each object 400 includes a unique identifier, such as the object ID 402. The object 400 includes one or more facts 404. Each fact 404 includes a unique identifier for that fact, such as a fact ID 410. Each fact 404 includes an attribute 412 and a value 414. For example, facts included in an object representing George Washington may include facts having attributes of "date of birth" and "date of death," and the values of these facts would be the actual date of birth and date of death, respectively. A fact 404 may include a link 416 to another object, which is the object identifier, such as the object ID 402 of another object within the fact repository 114. The link 416 allows objects to have facts whose values are other objects. For example, for an object "United States," there may be a fact with the attribute "president" whose value is "George W. Bush,", with "George W. Bush" being another object in the fact repository 114. In some embodiments, the value field 414 stores the name of the linked object and the link 416 stores the object identifier of the linked object. In some other embodiments, facts 404 do not include a link field 416 because the value 414 of a fact 404 may store a link to another object.

Each fact 404 also may include one or more metrics 418. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 404 includes a list of sources 420 that include the fact and from which the fact was extracted. Each source may be identified by a Uniform Resource Locator (URL), or Web address, or any other appropriate form of identification and/or location, such as a unique document identifier.

In some embodiments, some facts may include an agent field 422 that identifies the module that extracted the fact. For example, the agent may be a specialized module that extracts facts from a specific source (e.g., the pages of a particular web site, or family of web sites) or type of source (e.g., web pages that present factual information in tabular form), or a module that extracts facts from free text in documents throughout the Web, and so forth.

In some embodiments, an object 400 may have one or more specialized facts, such as a name fact 406 and a property fact 408. A name fact 406 is a fact that conveys a name for the entity or concept represented by the object 400. For example, for an object representing the country Spain, there may be a fact conveying the name of the object as "Spain." A name fact 406, being a special instance of a general fact 404, includes the same parameters as any other fact 404; it has an attribute, a value, a fact ID, metrics, sources, etc. The attribute 424 of a name fact 406 indicates that the fact is a name fact, and the value is the actual name. The name may be a string of characters. An object 400 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office." If an object has one or more name facts, one of the name facts may be designated as a primary name and the other name facts may be designated as secondary names.

It should be appreciated that the first or second labels associated with A-V pairs extracted from a source document, as described above, may be made into name facts for the object with which the A-V pairs are associated. For example, the first label may be made into a name fact that serves as a primary name for the object and the second label(s) may be made into name facts that serve as secondary names for the object.

A property fact 408 is a fact that conveys a statement about the entity or concept represented by the object 400 that may be of interest. For example, for the object representing Spain, a property fact may convey that Spain is a country in Europe. A property fact 408, being a special instance of a general fact 404, also includes the same parameters (such as attribute, value, fact ID, etc.) as other facts 404. The attribute field 426 of a property fact 408 indicates that the fact is a property fact, and the value field is a string of text that conveys the statement of interest. For example, for the object representing Spain, the value of a property fact may be the text string "is a country in Europe." Some objects 400 may have one or more property facts while other objects may have no property facts.

It should be appreciated that the data structure illustrated in FIG. 4 and described above is merely exemplary. The data structure of the fact repository 114 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity or concept represented by the object. In some embodiments, an object's name(s) and/or properties may be represented by special records that have a different format than the general facts records 404 associated with the attribute-value pairs of an object.

Figure 5:
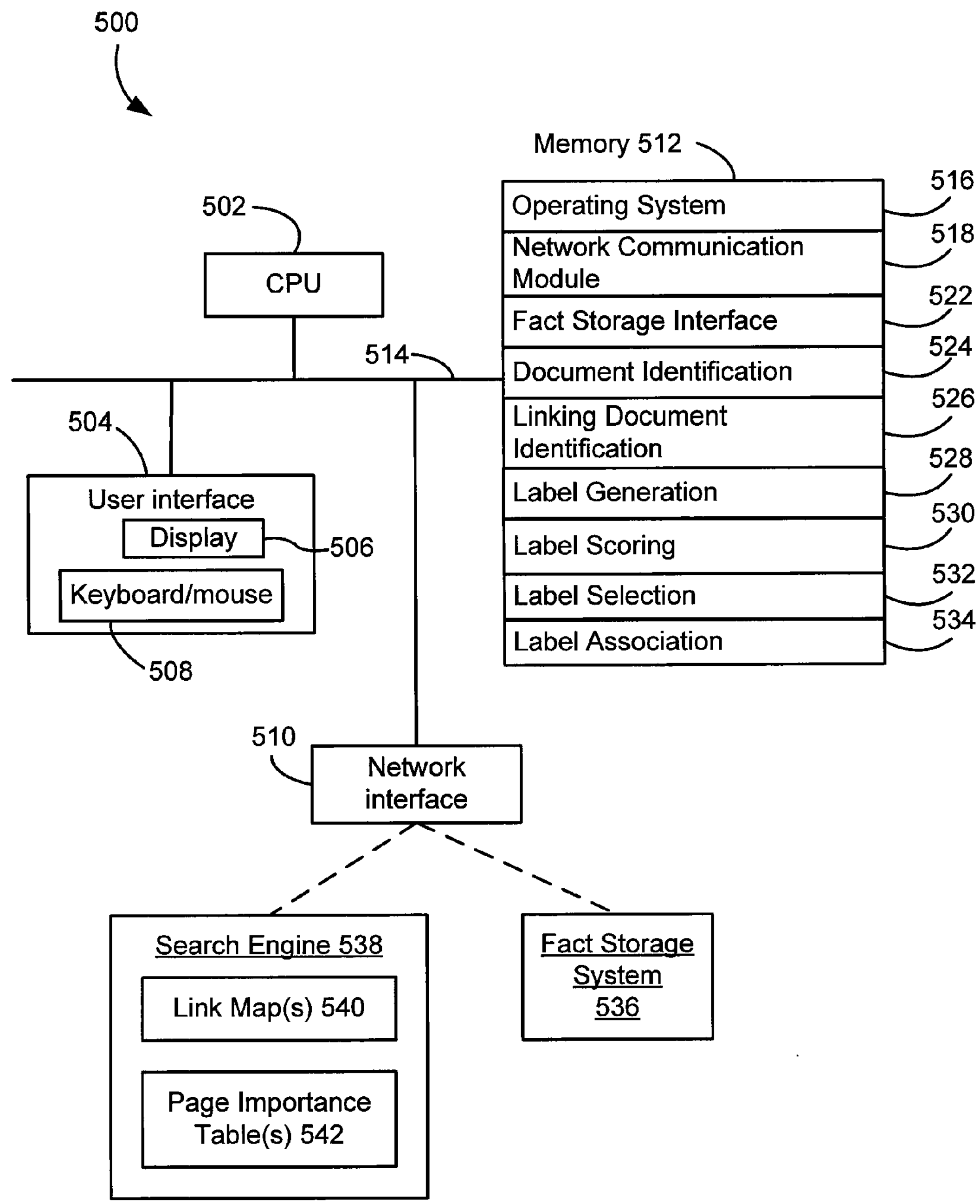
FIG. 5 illustrates a document processing system, according to some embodiments of the invention.

FIG. 5 is a block diagram illustrating a document processing system 500, according to some embodiments of the invention. The system 500 typically includes one or more processing units (CPU's) 502, one or more network or other communications interfaces 510, memory 512, and one or more communication buses 514 for interconnecting these components. The system 500 optionally may include a user interface 504 comprising a display device 506, keyboard 508 and pointer device 509, such as a mouse, track ball or touch sensitive pad. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. In some embodiments, memory 512 stores the following programs, modules and data structures, or a subset thereof:

- an operating system 516 that includes procedures for handling various basic system services and for performing hardware dependent tasks;
- a network communication module (or instructions) 518 that is used for connecting the system 500 to other computers via the one or more communication network interfaces 510 (wired or wireless), such as the Internet, other wide area networks, local area networks, metropolitan area networks, and so on;

a fact storage interface 522 that interfaces with a fact storage system 536 (which may include a fact index and fact repository, and/or other appropriate data structures);

a document identification module (or instructions) 524 that identifies source documents that include factual information;

a linking document identification module (or instructions) 526 that identifies linking documents;

a label generation module (or instructions) 528 that identifies anchor texts from links and generates candidate labels from the anchor texts;

a label scoring module (or instructions) 530 that scores the candidate labels;

a label selection module (or instructions) 532 that selects labels based on their scores; and a label association module (or instructions) 534 that associates selected labels with source documents and/or A-V pairs.

The label scoring module 530 scores the candidate labels. In some embodiments, the "score" of a candidate label is a count (which may or may not be weighted) of linking documents that include a link, to the source document with the corresponding anchor text. In some other embodiments, the "score" of a candidate label is the cosine distance of a frequency vector, corresponding to the candidate label, to a centroid vector. In an exemplary embodiment, the label association module 534 inserts the selected labels into objects or records in a facts database, for instance by adding name facts 404 to an object 400 containing the A-V pairs with which a particular selected label is to be associated.

The system 500 also includes a fact storage system 536 for storing and indexing facts. As described above, in some embodiments each fact stored in the fact storage system 536 includes a corresponding list of sources from which the respective fact was extracted. In some embodiments, the system 500 includes a search engine 538 for locating documents. The search engine may include one or more link maps 540 and one or more page importance tables 542. In alternative embodiments, the link maps 540 and page importance tables 542 may be located in memory 512 of the document processing system. The link maps map the linkage of documents. The page importance tables lists documents and their corresponding page importance metrics.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows a "document processing system," FIG. 5 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a document processing system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a set of documents for generating a facts database, comprising:

at a system having one or more processors and memory storing one or more modules to be executed by the one or more processors:

accessing a source document from a document host;

extracting one or more facts from the source document;

identifying a set of linking documents that have one or more links to the source document, wherein a respective link contains anchor text;

generating a set of candidate labels from the anchor text of the linking documents, a respective candidate label of the set of candidate labels comprising text extracted from the anchor text in the one or more links to the source document in the set of linking documents;

selecting a respective candidate label from the set of candidate labels as a unifying subject of the one or more facts extracted from the source document; and storing in the facts database an information set distinct from the source document, wherein the information set includes the unifying subject, one or more entries corresponding to the one or more facts extracted from the source document, and source document information for the one or more facts corresponding to the one or more entries.

2. The method of claim 1, further comprising:

selecting one or more second labels of the candidate labels according to predefined criteria; and associating the selected second labels with the source document and the one or more facts extracted from the source document.

3. The method of claim 1, wherein selecting the candidate label comprises:

for each of the set of candidate labels:

determining a set of frequencies of one or more substrings of the candidate label; and generating a frequency vector associated with the candidate label based on the set of frequencies; and determining a centroid vector based on the frequency vectors of the candidate labels, wherein the selected candidate label is associated with a respective frequency vector having a shortest distance to the centroid vector.

4. A server system for processing a set of documents for generating a facts database, comprising:

one or more processors;

memory storing one or more programs to be executed by the one or more processors, the one or more programs including instructions to:

access a source document from a document host;

extract one or more facts from the source document;

identify a set of linking documents that have one or more links to the source document, wherein a respective link contains anchor text; and generate a set of candidate labels from the anchor text of the linking documents, a respective candidate label of the set of candidate labels comprising text extracted from the anchor text in the one or more links to the source document in the set of linking documents;

select a respective candidate label from the set of candidate labels as a unifying subject of the one or more facts extracted from the source document; and store in the facts database an information set distinct from the source document, wherein the information set includes the unifying subject, one or more entries corresponding to the one or more facts extracted from the source document, and source document information for the one or more facts corresponding to the one or more entries.

5. The system of claim 4, wherein the one or more programs further include instructions to:

select one or more second labels of the candidate labels according to predefined criteria; and associate the selected second labels with the source document and the one or more facts extracted from the source document.

6. The system of claim 4, wherein the instructions to select a respective candidate label as a unifying subject include instructions to:

for each of the set of candidate labels:

determine a set of frequencies of one or more substrings of the candidate label; and generate a frequency vector associated with the candidate label based on the set of frequencies; and determine a centroid vector based on the frequency vectors of the candidate labels, wherein the selected candidate label is associated with a respective frequency vector having a shortest distance to the centroid vector.

7. A non-transitory computer readable storage medium storing one or more computer programs executed by a computerized server system, the one or more computer programs comprising instructions to generate a facts database, the instructions including:

instructions to access a source document from a document host;

instructions to extract one or more facts from the source document;

instructions to identify a set of linking documents that have one or more links to the source document, wherein a respective link contains anchor text;

instructions to generate a set of candidate labels from the anchor text of the linking documents, a respective candidate label of the set of candidate labels comprising text extracted from the anchor text in the one or more links to the source document in the set of linking documents;

instructions to select a respective candidate label from the set of candidate labels as a unifying subject of the one or more facts extracted from the source document; and instructions to store in the facts database an information set distinct from the source document, wherein the information set includes the unifying subject, one or more entries corresponding to the one or more facts extracted from the source document, and source document information for the one or more facts corresponding to the one or more entries.

8. The computer readable storage medium of claim 7, further comprising instructions to:

select one or more labels of the candidate labels according to predefined criteria; and associate the selected second labels with the source document and the one or more facts extracted from the source document.

9. The computer readable storage medium of claim 7, wherein the instructions to select a respective candidate label as a unifying subject comprise instructions to:

for each of the set of candidate labels:

determine a set of frequencies of one or more substrings of the candidate label; and generate a frequency vector associated with the candidate label based on the set of frequencies; and determine a centroid vector based on the frequency vectors of the candidate labels, wherein the selected label is associated with a respective frequency vector having a shortest distance to the centroid vector.

* * * * *